(12) United States Patent
Dudar

(10) Patent No.: US 9,709,007 B2
(45) Date of Patent: Jul. 18, 2017

(54) METHODS AND SYSTEMS FOR VEHICLE AMBIENT HYDROCARBON LEVEL MONITORING

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 14/693,535

(22) Filed: Apr. 22, 2015

(65) Prior Publication Data
US 2016/0312718 A1    Oct. 27, 2016

(51) Int. Cl.
| | |
|---|---|
| *F02M 25/08* | (2006.01) |
| *F02D 41/30* | (2006.01) |
| *F02D 41/00* | (2006.01) |
| *B60H 1/00* | (2006.01) |
| *F02D 41/02* | (2006.01) |
| *F02D 41/14* | (2006.01) |
| *F02M 25/00* | (2006.01) |

(52) U.S. Cl.
CPC ......... *F02M 25/0854* (2013.01); *B60H 1/008* (2013.01); *B60H 1/00849* (2013.01); *F02D 41/003* (2013.01); *F02D 41/0045* (2013.01); *F02D 41/0072* (2013.01); *F02D 41/021* (2013.01); *F02D 41/144* (2013.01); *F02D 41/3094* (2013.01); *F02M 25/089* (2013.01); *F02D 41/1454* (2013.01); *F02D 2200/70* (2013.01)

(58) Field of Classification Search
CPC . F02M 25/0854; F02M 25/0836; F02M 25/08
USPC ................................ 123/519, 520, 518, 516
See application file for complete search history.

(56) References Cited

U.S. PATENT DOCUMENTS

| | | | | |
|---|---|---|---|---|
| 5,850,819 A | * | 12/1998 | Kunimitsu | F02M 25/089 123/516 |
| 6,293,261 B1 | * | 9/2001 | Oemcke | F02M 25/0854 123/516 |
| 6,499,472 B2 | * | 12/2002 | Weldon | F16K 31/0655 123/516 |
| 6,546,955 B1 | * | 4/2003 | Burke | F02M 25/089 123/516 |
| 7,056,474 B2 | | 6/2006 | Dumas et al. | |

(Continued)

*Primary Examiner* — Mahmoud Gimie
(74) *Attorney, Agent, or Firm* — James Dottavio; McCoy Russell LLP

(57) ABSTRACT

Methods and systems are provided for adjusting a vehicle operation based on an output of a hydrocarbon sensor located in a canister vent line coupling a fuel vapor canister and the atmosphere in order to reduce exhaust and evaporative emissions, and improve fuel economy while providing improved cabin comfort. Specifically, in response to determining an ambient hydrocarbon amount greater than a threshold based on the hydrocarbon sensor output during purging, the purging operation may be terminated, and the canister may be sealed from the atmosphere. Further, in response to the determination, a vehicle climate control system may be adjusted to stop providing fresh air to the vehicle cabin and provide only cabin air recirculation, and an engine operation may be adjusted such that a ratio of a port fuel injection amount to a direct fuel injection amount is increased.

19 Claims, 6 Drawing Sheets

(56) References Cited

U.S. PATENT DOCUMENTS

| | | |
|---|---|---|
| 7,774,128 B2 | 8/2010 | Kim |
| 7,803,039 B2 | 9/2010 | Inoue et al. |
| 8,181,631 B2 | 5/2012 | Bohr et al. |
| 8,573,187 B2 | 11/2013 | Knittel et al. |
| 8,707,935 B2 | 4/2014 | Weber et al. |

\* cited by examiner

METHODS AND SYSTEMS FOR VEHICLE AMBIENT HYDROCARBON LEVEL MONITORING

FIELD

The present description relates generally to methods and systems for adjusting a vehicle operation based on a hydrocarbon sensor output.

BACKGROUND/SUMMARY

Fuel vapors comprise vaporized hydrocarbons (HCs) that contribute to the formation of hazardous ground-level ozone. Accordingly, vehicles may be fitted with evaporative emission control systems to reduce the release of fuel vapors to the atmosphere. For example, vaporized HCs from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel.

During a purge operation, a canister purge valve coupling the canister and the engine is opened, and the engine vacuum is utilized to draw ambient air into the canister via a canister vent line to release the stored hydrocarbons. However, if a vehicle is operating in an area where the ambient hydrocarbon levels are high, during purging, the ambient air drawn into the canister may not efficiently release the stored hydrocarbons. Consequently, instead of purging the stored hydrocarbons, ambient air may be purged into the intake manifold, which may lead to operating the engine at a more lean air to fuel ratio than desired. As a result, fuel economy may be reduced, and exhaust emissions may increase. Further, if the stored hydrocarbons are not purged, the canister may become saturated and may not be able to adsorb any additional fuel vapors that are generated. Consequently, the fuel vapors may be released into the atmosphere leading to degraded evaporative emissions control system performance.

The inventors herein have recognized the above issues, and have developed systems and methods to at least partially address them. In one example, a method comprises: in response to an ambient hydrocarbon amount estimated during purging fuel vapors from a canister to an engine being greater than a threshold, terminating the purging by closing a canister purge valve; and sealing the canister from the ambient air by closing a canister vent valve. In this way, by terminating a purging operation and sealing the evaporative emissions system when ambient hydrocarbon levels are high, purging of ambient air may be reduced and hydrocarbon breakthrough to the atmosphere may be reduced.

For example, during purging fuel vapors from the canister, an ambient hydrocarbon amount may be estimated based on an output from a hydrocarbon sensor located in a canister vent line through which ambient air is drawn into the canister. If the estimated hydrocarbon amount is greater than a threshold amount, poor ambient air quality may be inferred. Accordingly, the purging is terminated by closing a canister purge valve, and the evaporative emissions control system is sealed by closing a canister vent valve located in the canister vent line. Further, a vehicle climate control system is adjusted so that only air from the vehicle cabin is recirculated and no fresh air is provided to the vehicle cabin. By providing full cabin air recirculation, the vehicle cabin may be insulated from poor air quality. Still further, in an engine system equipped with a direct fuel injector and a port fuel injector for each engine cylinder, in response to estimating ambient hydrocarbon levels greater than the threshold, engine operation may be adjusted to increase a ratio of a port injected fuel amount to a direct injected fuel amount in order to reduce particulate matter emissions.

In this way, a hydrocarbon sensor located in the canister vent line may be utilized to detect an ambient hydrocarbon amount during purging. If high ambient hydrocarbon amounts are detected, vehicle operations may be adjusted to reduce purging ambient air, reduce hydrocarbon breakthrough, reduce exposure of vehicle occupants to poor air quality, and reduce particulate emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
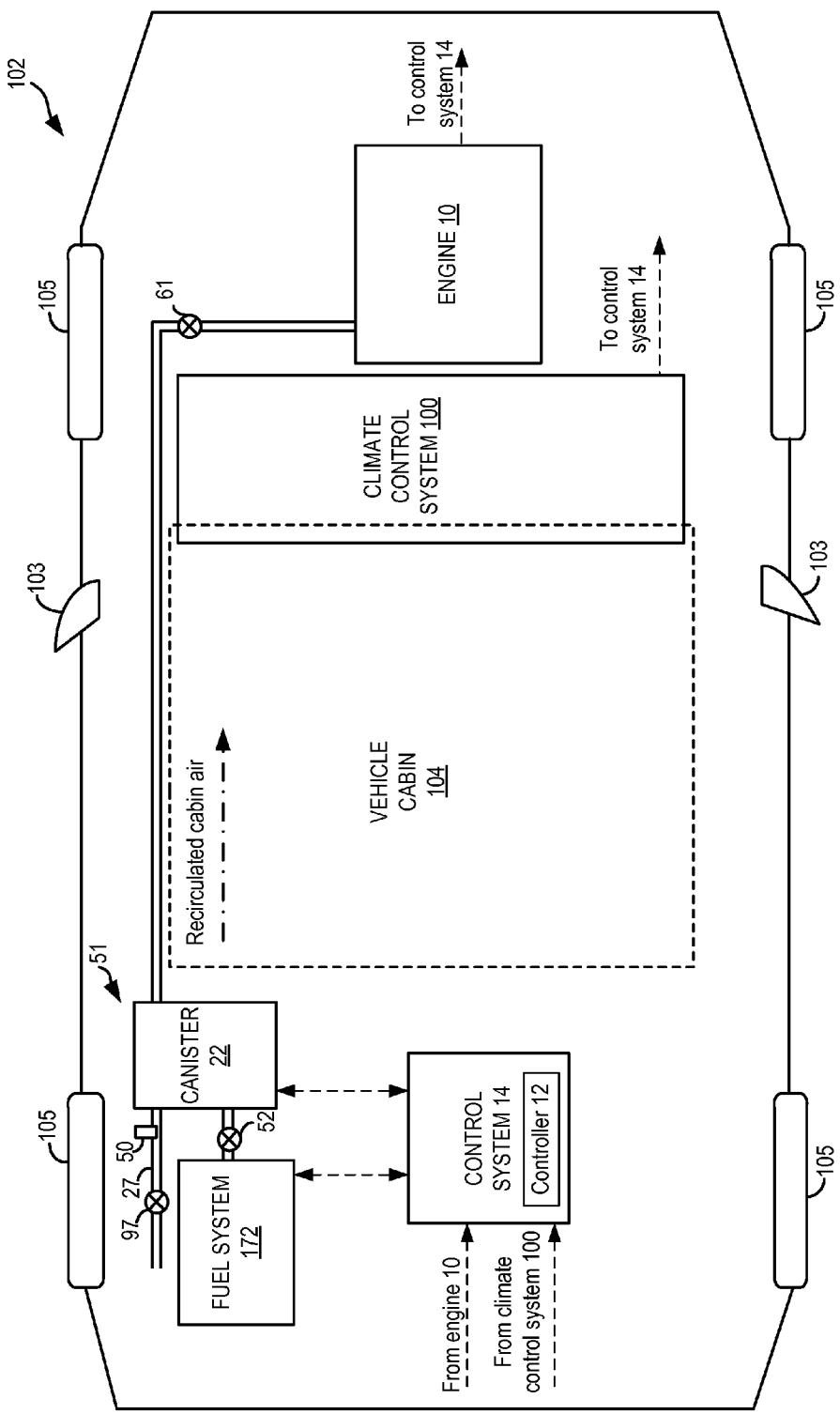
FIG. 1 schematically depicts an overview of an example motor vehicle system including a climate control system.
Figure 2:
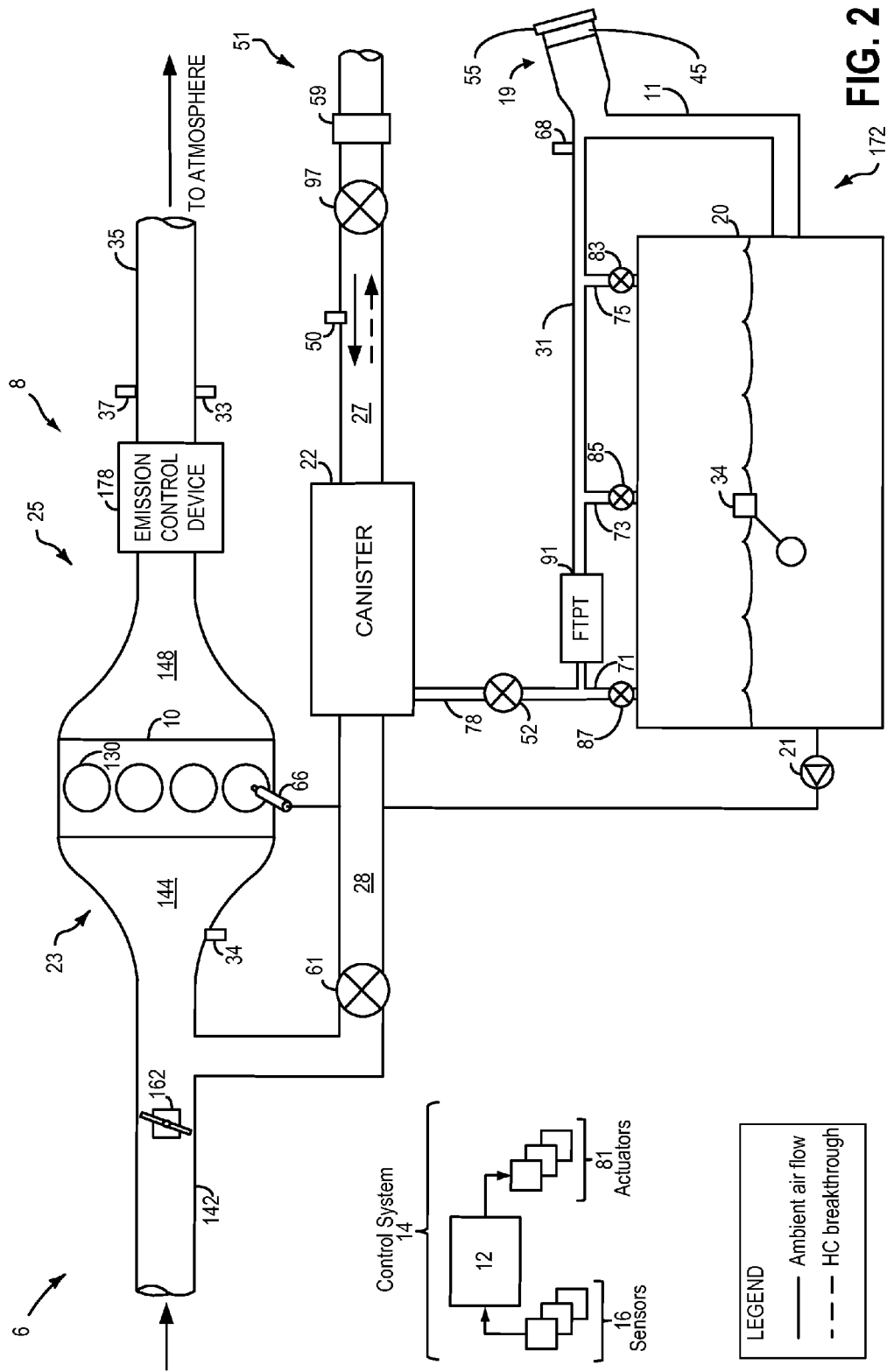
FIG. 2 schematically shows an example evaporative emissions control system, an engine system, and a fuel system included in the vehicle system of FIG. 1.
Figure 3:
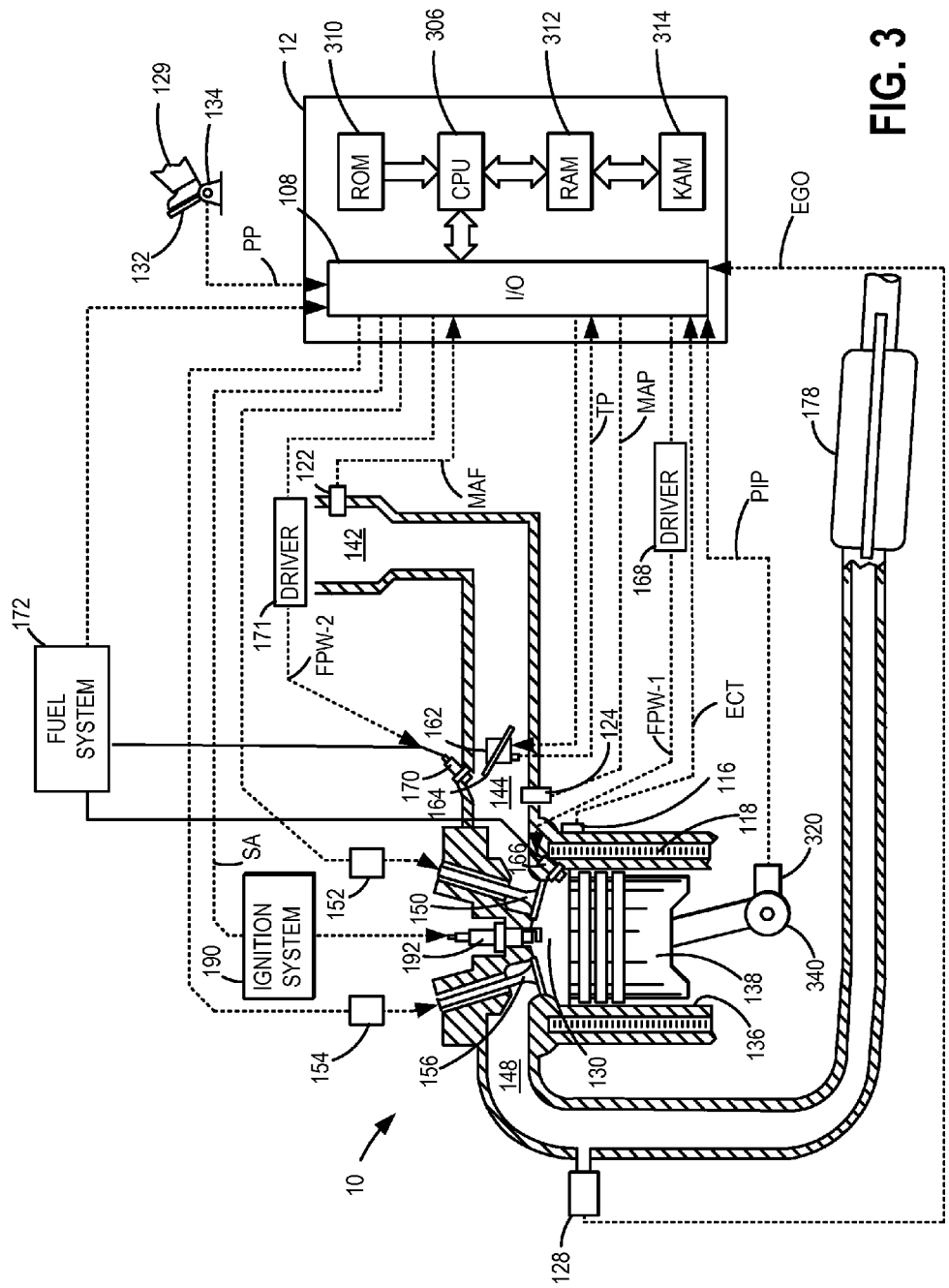
FIG. 3 schematically shows a combustion chamber of an internal combustion engine.
Figure 5:
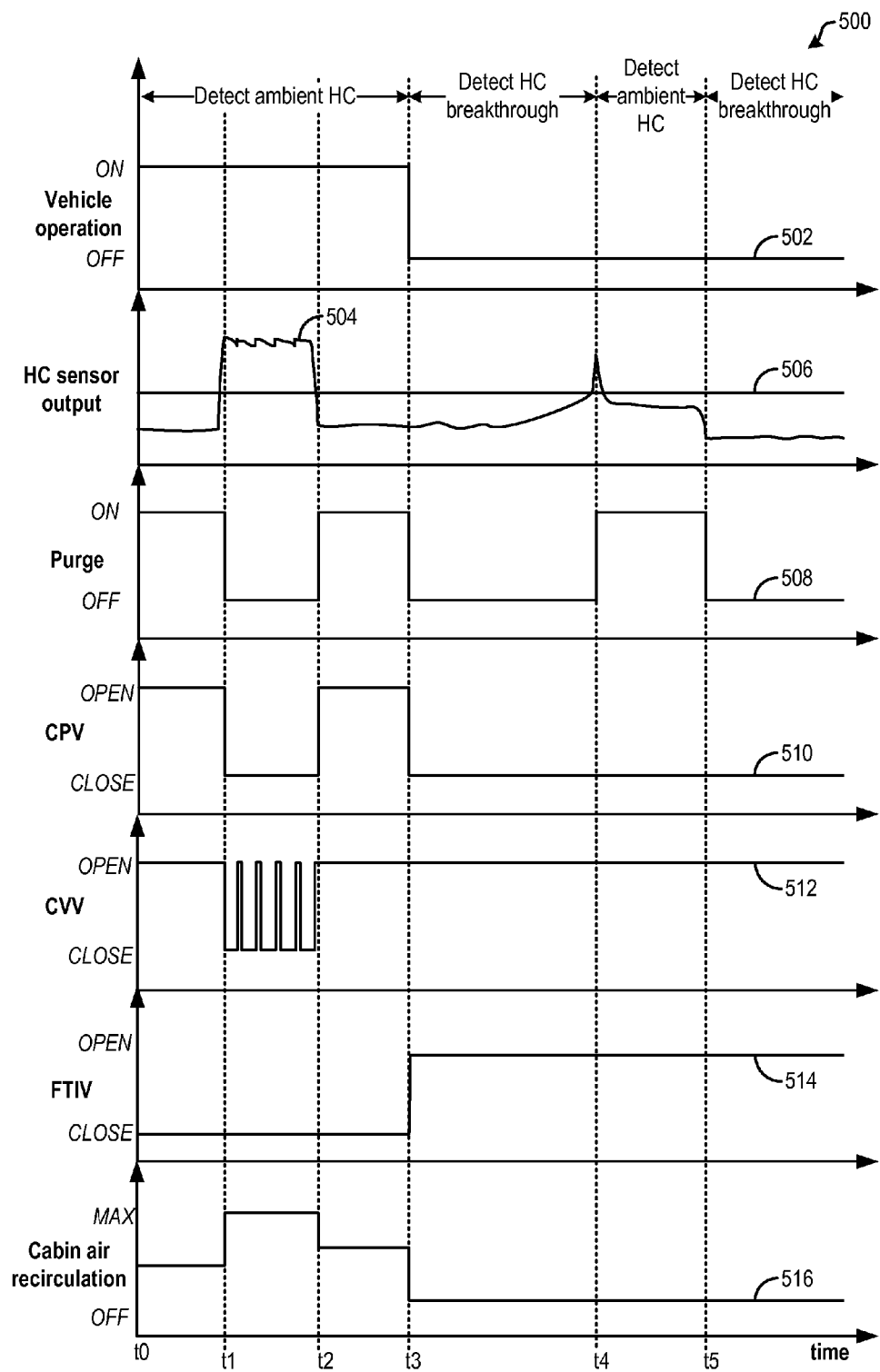
FIG. 5 shows an example adjustment of an evaporative emissions control system operation and a climate control system operation based on a HC sensor output according to the present disclosure.
Figure 6:
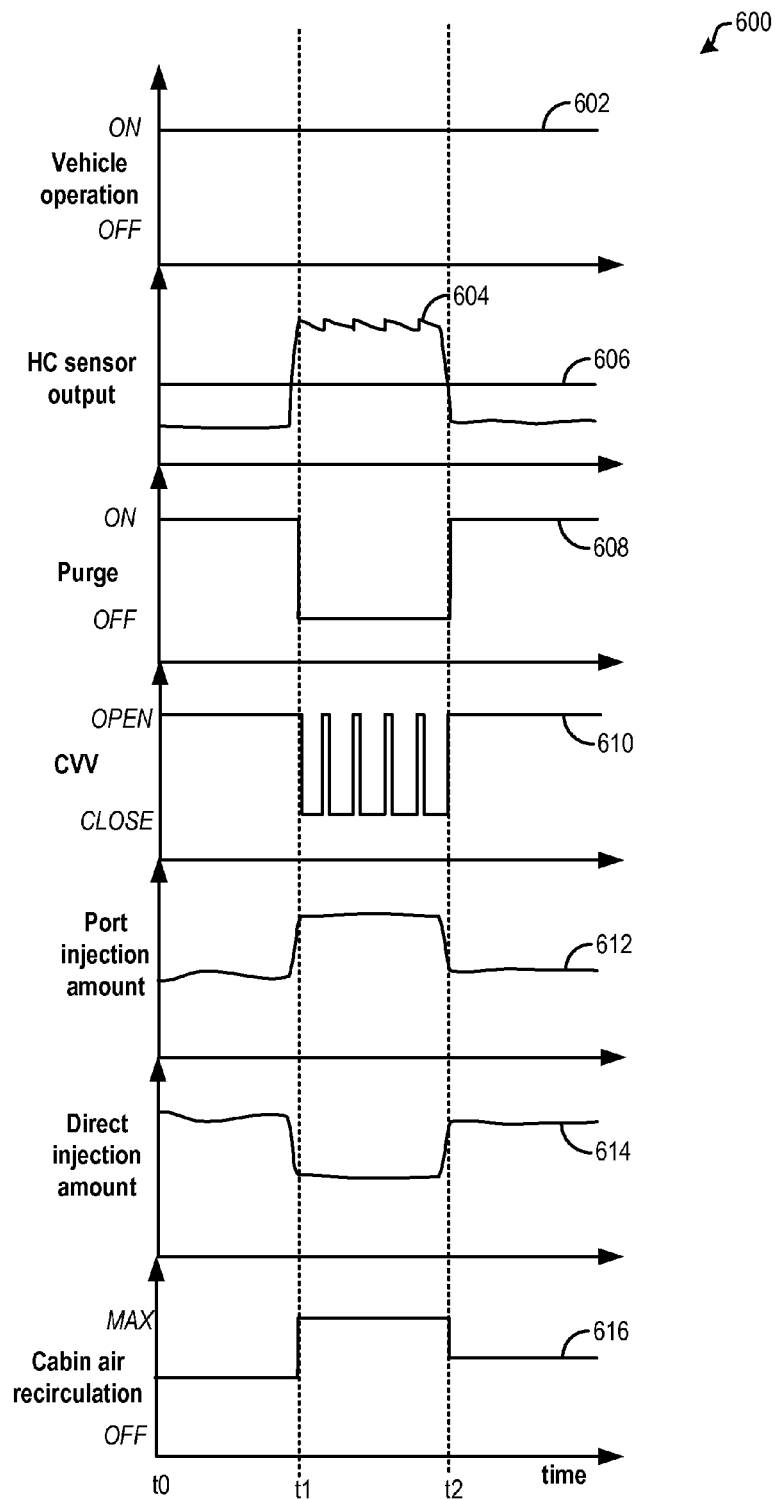
FIG. 6 shows an example adjustment of an engine operation based on a HC sensor output according to the present disclosure.

The following description relates to systems and methods for adjusting an operation of a vehicle, such as the vehicle depicted at FIG. 1, based on a hydrocarbon sensor output such as the HC sensor shown at FIGS. 1-3. Specifically, in response to the hydrocarbon sensor output increasing above a threshold, a climate control system, such as the climate control system of FIG. 1 may be adjusted. Further, an evaporative emissions control system, such as the emissions control system of FIGS. 1-3, and an engine system, such as the engine system of FIGS. 1-3, may be adjusted. An engine controller, such as controller 12 of FIGS. 1-3, may perform a control routine, such as the routine of FIG. 4, to determine if excess hydrocarbon amounts above a threshold amount are present in a canister vent line based on the output of a hydrocarbon sensor and if so, the controller may determine a source of the excess hydrocarbons (hydrocarbons in ambient air versus hydrocarbon resulting from canister breakthrough), and may adjust the vehicle operation accordingly. Example adjustments of climate control system, and evaporative emissions control system in response to HC sensor output are shown at FIG. 5. An example adjustment of engine operation in response to HC sensor output is shown at FIG. 6.

Turning now to FIG. 1, an example overview of a motor vehicle 102 including a vehicle climate control system 100, a fuel system 172, and an evaporative emissions control system 51 is illustrated schematically. Vehicle 102 includes drive wheels 105, a vehicle passenger cabin 104, and an internal combustion engine 10. Motor vehicle 102 may be a road automobile, among other types of vehicles.

Evaporative emissions control system 51 includes a canister 22 for storing fuel vapors routed from fuel system 172, a canister purge valve (CPV) 61 for purging stored fuel vapors into an intake manifold of engine 10, a canister vent valve (CVV) 97 for regulating flow of ambient air and vapors between canister 22 and the atmosphere, and a fuel tank isolation valve (FTIV) 52 for venting fuel vapors from a fuel tank included in system 172 to the atmosphere. A hydrocarbon sensor 50 located in a canister vent line 27 coupling canister 22 and the atmosphere may provide an indication of an ambient hydrocarbon amount in the atmosphere during a canister purging operation. Hydrocarbon sensor 50 may also provide an indication of hydrocarbon breakthrough from the canister to the atmosphere during conditions when the vehicle is off and the canister is not purging. In response to an indication that the ambient hydrocarbon amount is greater than a threshold amount, a vehicle controller 12 may adjust an operation of evaporative emissions control system 51, an operation of climate control system 100, and an operation of engine 10, details of which will be further elaborated with regards to FIGS. 4-6. As an example, in response to the hydrocarbon amount being greater than the threshold, the canister purging operation may be terminated, and evaporative emissions control system 51 may be sealed by closing CVV 97 to prevent hydrocarbon breakthrough. Further, climate control system 100 may be adjusted so as to recirculate air from within vehicle cabin 104 and stop delivering ambient air to vehicle cabin 104. Still further, a ratio of a direct fuel injection amount to a port fuel injection amount, a PCV flow estimate, and an EGR flow estimate may be adjusted.

FIG. 1 further shows a control system 14 of vehicle 102. Control system 14 may be communicatively coupled to various components of engine 10, climate control system 100, fuel system 172, and evaporative emissions control system 51 to carry out the control routines and actions described herein. Control system 14 may include an electronic digital controller 12. Controller 12 may be a microcomputer, including a microprocessor unit, input/output ports, an electronic storage medium for executable programs and calibration values, random access memory, keep alive memory, and a data bus.

Controller 12 may receive input from a plurality of sensors, which may include user inputs and/or sensors (such as transmission gear position, transmission clutch position, gas pedal input, brake input, transmission selector position, vehicle speed, engine speed, mass airflow through the engine, ambient temperature, intake air temperature, hydrocarbon, etc.), climate control system sensors (such as coolant temperature, adsorbent temperature, fan speed, passenger compartment temperature, desired passenger compartment temperature, ambient humidity, etc.), and others.

Further, controller 12 may communicate with various actuators, which may include engine actuators (such as fuel injectors, an electronically controlled intake air throttle plate, spark plugs, transmission clutches, etc.), climate control system actuators (such as air handling vents and/or diverter valves, valves controlling the flow of coolant, blower actuators, fan actuators, etc.), evaporative emissions control system actuators (such as CPV, CVV, fuel tank isolation valve etc.) and others. In some examples, the storage medium may be programmed with computer readable data representing instructions executable by the processor for performing the methods described below as well as other variants that are anticipated but not specifically listed.

In one example, the system of FIG. 1 provides for a vehicle system, comprising: an engine; a heating, ventilation, and air-conditioning system; a fuel vapor canister; a hydrocarbon sensor coupled within a canister vent line coupling the canister to ambient air; and a controller configured with instructions stored in non-transitory memory, that when executed, cause the controller to: during a first condition, determine that an ambient hydrocarbon amount is greater than a threshold amount; and during a second condition, determine hydrocarbon breakthrough from the canister. The method further comprises wherein the first condition includes an output of the hydrocarbon sensor greater than a threshold, a vehicle on condition, and purging fuel vapors; and wherein the second condition includes the output of the hydrocarbon sensor greater than the threshold, a vehicle-off condition, and not purging fuel vapors. The method further comprises wherein the controller is further configured with instructions stored in non-transitory memory, that when executed, causes the controller to: during the first condition, in response to the determination: close a canister purge valve disposed in a conduit coupling the canister to an intake of the engine, close a canister vent valve disposed in the canister vent line, adjust an engine operation to increase a ratio of a portion of fuel port injected into an engine cylinder to a remaining portion of fuel direct injected into the cylinder; and adjust an operation of the heating, ventilation, and air-conditioning system to stop recirculation of ambient air within a vehicle cabin and recirculate only cabin air within the cabin; and during the second condition, in response to the hydrocarbon breakthrough determination: open the canister purge valve, and open the canister vent valve.

FIG. 2 shows a schematic depiction of vehicle system 102 including an engine system 8 coupled to emissions control system 51 and fuel system 172. As discussed above with regards to FIG. 1, emissions control system 51 includes fuel vapor container or canister 22 which may be used to capture and store fuel vapors. In some examples, vehicle system 102 may be a hybrid electric vehicle system.

Engine system 8 may include internal combustion engine 10 having a plurality of cylinders 130. Engine 10 includes an engine intake 23 and an engine exhaust 25. Engine intake 23 includes a throttle 162 fluidly coupled to the engine intake manifold 144 via an intake passage 142. An intake oxygen sensor 34 located in intake manifold 144 may be utilized to estimate a PCV flow, and an EGR flow. During certain engine operating conditions when an ambient hydrocarbon amount is greater than a threshold, estimates of PCV flow and EGR flow determined based on an output of intake oxygen sensor 34 may be adjusted to compensate for increased amount of hydrocarbon in the ambient air. Details of adjusting the PCV flow and the EGR flow estimates will be further elaborated with respect to FIGS. 4 and 6.

Engine exhaust 25 includes an exhaust manifold 148 leading to an exhaust passage 35 that routes exhaust gas to the atmosphere. The engine exhaust 25 may include one or more emission control devices 178, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 172 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. For example, each cylinder of engine 10 may include a direct fuel injector and a port fuel injector. It will be appreciated that fuel system 18 may be a return-less fuel system, a return fuel system, or various other types of fuel system. Fuel tank 20 may hold a plurality of fuel blends, including fuel with a range of alcohol concentrations, such as various gasoline-ethanol blends, including E10, E85, gasoline, etc., and combinations thereof. A fuel level sensor 234 located in fuel tank 20 may provide an indication of the fuel level ("Fuel Level Input") to controller 12. As depicted, fuel level sensor 234 may comprise a float connected to a variable resistor. Alternatively, other types of fuel level sensors may be used.

Vapors generated in fuel system 18 may be routed to evaporative emissions control system 51 including fuel vapor canister 22 via vapor recovery line 31, before being purged to engine intake 23. Vapor recovery line 31 may be coupled to fuel tank 20 via one or more conduits and may include one or more valves for isolating the fuel tank during certain conditions. For example, vapor recovery line 31 may be coupled to fuel tank 20 via one or more or a combination of conduits 71, 73, and 75.

Further, in some examples, one or more fuel tank vent valves may be deposed in conduits 71, 73, or 75. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 71 may include a grade vent valve (GVV) 87, conduit 73 may include a fill limit venting valve (FLVV) 85, and conduit 75 may include a grade vent valve (GVV) 83. Further, in some examples, recovery line 31 may be coupled to a fuel filler system 19. In some examples, fuel filler system 19 may include a fuel cap 5 for sealing off the fuel filler system from the atmosphere. Fuel filler system 19 is coupled to fuel tank 20 via a fuel filler pipe or neck 11.

Fuel filler system 19 may include refueling lock 45. In some embodiments, refueling lock 45 may be a fuel cap locking mechanism. In some other embodiments, refueling lock 45 may be a filler pipe valve located at a mouth of fuel filler pipe 11. In still other embodiments, refueling lock 45 may be a refueling door lock, such as a latch or a clutch which locks a refueling door located in a body panel of the vehicle.

Emissions control system 51 may include one or more emissions control devices, such as one or more fuel vapor canisters 22 filled with an appropriate adsorbent, the canisters are configured to temporarily trap fuel vapors (including vaporized HCs) during fuel tank refilling operations and "running loss" (that is, fuel vaporized during vehicle operation). In one example, the adsorbent used is activated charcoal. Emissions control system 51 may further include canister ventilation path or canister vent line 27 which may route gases out of the canister 22 to the atmosphere when storing, or trapping, fuel vapors from fuel system 18.

Canister vent line 27 may also allow fresh air to be drawn into canister 22 when purging stored fuel vapors from fuel system 18 to engine intake 23 via purge line 28 and CPV 61. For example, CPV 61 may be normally closed but may be opened during certain conditions so that vacuum from engine intake manifold 44 is provided to the fuel vapor canister for purging. In some examples, canister vent line 27 may include an air filter 59 disposed therein upstream of a canister 22.

The flow of air and vapors between canister 22 and the atmosphere may be regulated by CVV 97 coupled within canister vent line 27. During fuel vapor storing operations (for example, during fuel tank refueling and while the engine is not running), CVV 97 may be opened so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. CVV 97 may be a normally open valve, so that FTIV 52 may control venting of fuel tank 20 with the atmosphere. In some examples, CVV 97 may be a solenoid valve wherein opening or closing of the valve is performed via actuation of a canister vent solenoid. In particular, the CVV may be an open valve that is closed upon actuation of the canister vent solenoid. In some examples, CVV 97 may be configured as a latchable solenoid valve.

FTIV 52 may be positioned between the fuel tank and the fuel vapor canister within conduit 78. FTIV 52 may be a normally closed valve, that when opened, allows for the venting of fuel vapors from fuel tank 20 to canister 22. Fuel vapors may then be vented to atmosphere, or purged to engine intake system 23 via CPV 61.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open FTIV 52 while closing CPV 61 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open FTIV 52, while maintaining CPV 61 closed, to depressurize the fuel tank before allowing enabling fuel to be added therein. As such, FTIV 52 may be kept open during the refueling operation to allow refueling vapors to be stored in the canister. After refueling is completed, FTIV 52 may be closed.

As yet another example, the fuel system may be operated in a canister purging mode (e.g., after an emission control device light-off temperature has been attained and with the engine running), wherein the controller 12 may open CPV 61 while closing FTIV 52. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

During the canister purging mode, as ambient air (indicated by a solid arrow) is drawn through canister vent line 27, hydrocarbon sensor (HC sensor) 50 located within vent line 27 may provide an indication of an ambient hydrocarbon amount in the atmosphere. In the depicted example, HC sensor 50 is located in a canister vent line between a canister and a CVV. In some examples, HC sensor 50 may be located in canister vent line 27 at a location upstream of CVV 97 and between CVV 97 and an air filter 59. In other examples, two hydrocarbon sensors may be utilized, wherein a first hydrocarbon sensor is located upstream of the CVV and a second hydrocarbon sensor is located downstream of the CVV. In still other examples, additionally or alternatively, a hydrocarbon sensor may be located downstream of an engine air filter, or near a cabin air filter. In response to detecting an ambient hydrocarbon amount greater than a threshold during purging, canister purging may be terminated by closing CPV 61 to reduce purging of ambient air, and evaporative emissions system 51 may be sealed by closing CVV 97 to prevent hydrocarbon breakthrough.

During conditions when the vehicle is operating and not purging with CVV 97 closed, an ambient hydrocarbon amount may be determined by periodically opening CVV 97 to allow ambient air to flow through vent line and monitoring HC sensor output when CVV 97 is opened. That is, when the evaporative emissions control system is sealed and the vehicle is operating, CVV 97 may be opened for a first short duration to allow ambient air to flow through the canister vent line. During the first duration, an output of HC sensor indicates an ambient hydrocarbon amount. Subsequently, CVV 97 may be closed for a second longer duration. Opening CVV 97 for the first duration and closing CVV for the second duration may be repeated, and ambient hydrocarbon amount may be determined based on HC output during each opening. In this way, when the evaporative emissions control system is sealed (CVV 97 closed), ambient hydrocarbon amount may be determined based on HC sensor output. The canister purging operation may resume when HC sensor indicates that the ambient hydrocarbon amount is less than the threshold amount.

During vehicle-off and purging off conditions, HC sensor 50 may provide an indication of hydrocarbon breakthrough to the atmosphere from the canister. For example, if the vehicle is parked in a hot or sunny location over a diurnal cycle, the hydrocarbons stored in canister 22 may desorb from the canister and migrate to the atmosphere (as indicated by a broken arrow) via canister vent line. An amount of hydrocarbons migrating from the canister may be indicated based an output of HC sensor 50. Accordingly, when an output of HC sensor 50 indicates that a HC amount in vent line 27 is above a threshold amount, hydrocarbon breakthrough may be determined. In this way, during vehicle-off and purging off conditions, HC sensor 50 may be utilized to determine hydrocarbon breakthrough from the canister.

Controller 12 may comprise a portion of a control system 14. Control system 14 is shown receiving information from a plurality of sensors 16 (various examples of which are described herein) and sending control signals to a plurality of actuators 81 (various examples of which are described herein). As one example, sensors 16 may include hydrocarbon sensor 50 located in canister vent line 27, intake oxygen sensor 34, universal exhaust gas oxygen (UEGO) sensor 37 located upstream of the emission control device, temperature sensor 33, pressure sensor 91, and canister temperature sensor 43. Other sensors such as pressure, temperature, air/fuel ratio, and composition sensors may be coupled to various locations in the vehicle system 6. As another example, the actuators may include fuel injector 66, throttle 62, fuel tank isolation valve 53, pump 92, and refueling lock 45. The control system 130 may include a controller 12. The controller may be shifted between sleep and wake-up modes for additional energy efficiency. The controller may receive input data from the various sensors, process the input data, and trigger the actuators in response to the processed input data based on instruction or code programmed therein corresponding to one or more routines. An example control routine is described herein and with regard to FIG. 4.

Turning to FIG. 3, an example embodiment of a combustion chamber or cylinder 130 of internal combustion engine 10 depicted at FIGS. 1-2 is shown. Engine 10 may be controlled at least partially by a control system including controller 12 and by input from a vehicle operator 129 via an input device 132. In this example, input device 132 includes an accelerator pedal and a pedal position sensor 134 for generating a proportional pedal position signal PP. Cylinder (i.e. combustion chamber) 130 of engine 10 may include combustion chamber walls 136 with piston 138 positioned therein. Piston 138 may be coupled to crankshaft 340 so that reciprocating motion of the piston is translated into rotational motion of the crankshaft. Crankshaft 340 may be coupled to at least one drive wheel of the passenger vehicle via a transmission system. Further, a starter motor may be coupled to crankshaft 340 via a flywheel to enable a starting operation of engine 10.

Cylinder 130 can receive intake air via intake air passage 142, and intake manifold 144. Intake manifold 144 can communicate with other cylinders of engine 10 in addition to cylinder 130. In some embodiments, one or more of the intake passages may include a boosting device such as a turbocharger or a supercharger.

Exhaust manifold 148 can receive exhaust gases from other cylinders of engine 10 in addition to cylinder 130. Exhaust gas sensor 128 is shown coupled to exhaust manifold 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 130 is shown including at least one intake poppet valve 150 and at least one exhaust poppet valve 156 located at an upper region of cylinder 130. In some embodiments, each cylinder of engine 10, including cylinder 130, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 130 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In some embodiments, each cylinder of engine 10 may include a spark plug 192 for initiating combustion. Ignition system 190 can provide an ignition spark to combustion chamber 130 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 130 is shown including two fuel injectors 166 and 170. Fuel injector 166 is shown coupled directly to cylinder 130 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 130. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake manifold 144, rather than in cylinder 130, in a configuration that provides what is known as port injection of fuel (hereafter referred to as "PFI") into the intake port upstream of cylinder 130. Fuel injector 170 may inject fuel in proportion to the pulse width of signal FPW-2 received from controller 12 via electronic driver 171. Fuel may be delivered to fuel injector 170 by fuel system 172.

Fuel may be delivered by both injectors to the cylinder during a single cycle of the cylinder. For example, each injector may deliver a portion of a total fuel injection that is combusted in cylinder 130. Port injected fuel may be delivered during an open intake valve event, closed intake valve event (e.g., substantially before an intake stroke, such as during an exhaust stroke), as well as during both open and closed intake valve operation. Similarly, direct injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke or a combination of some direct injections during the compression stroke and some during the intake stroke. As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described herein, a ratio of a portion of fuel port injected to a remaining portion of fuel direct injected into cylinder 130 may be adjusted responsive to an ambient hydrocarbon amount greater than a threshold estimated during purging based on an output of HC sensor 50. For example, the ratio of the portion of fuel port injected to the remaining portion of fuel direct injected may be increased. That is, during a cylinder cycle, the portion of fuel port injected may be increased and the remaining portion of fuel direct injected may be decreased when an ambient hydrocarbon amount is greater than a threshold amount so as to reduce particulate matter emissions. Further, in some examples, the portion of fuel port injected may be delivered in a single port fuel injection and the remaining portion of direct injected fuel may be delivered in multiple fuel injections. Details of adjusting engine operation when an ambient hydrocarbon amount is greater than the threshold will be further elaborated with respect to FIGS. 4 and 6.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tank in fuel system 172 may hold fuel with different fuel qualities, such as different fuel compositions. These differences may include different alcohol content, different octane, different heat of vaporizations, different fuel blends, and/or combinations thereof etc. In one example, fuels with different alcohol contents could include gasoline, ethanol, methanol, or alcohol blends such as E85 (which is approximately 85% ethanol and 15% gasoline) or M85 (which is approximately 85% methanol and 15% gasoline). Other alcohol containing fuels could be a mixture of alcohol and water, a mixture of alcohol, water and gasoline etc.

Controller 12 is shown in FIG. 1 as a microcomputer, including microprocessor unit 306, input/output ports 108, an electronic storage medium for executable programs and calibration values shown as read only memory chip 310 in this particular example, random access memory 312, keep alive memory 314, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 320 (or other type) coupled to crankshaft 340; throttle position (TP) from a throttle position sensor; a intake air oxygen amount from an intake oxygen sensor (not shown) and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 310 can be programmed with computer readable data representing instructions executable by processor 306 for performing the methods described below as well as other variants that are anticipated but not specifically listed. An example routine that may be performed by the controller is described at FIG. 4.

Figure 4:
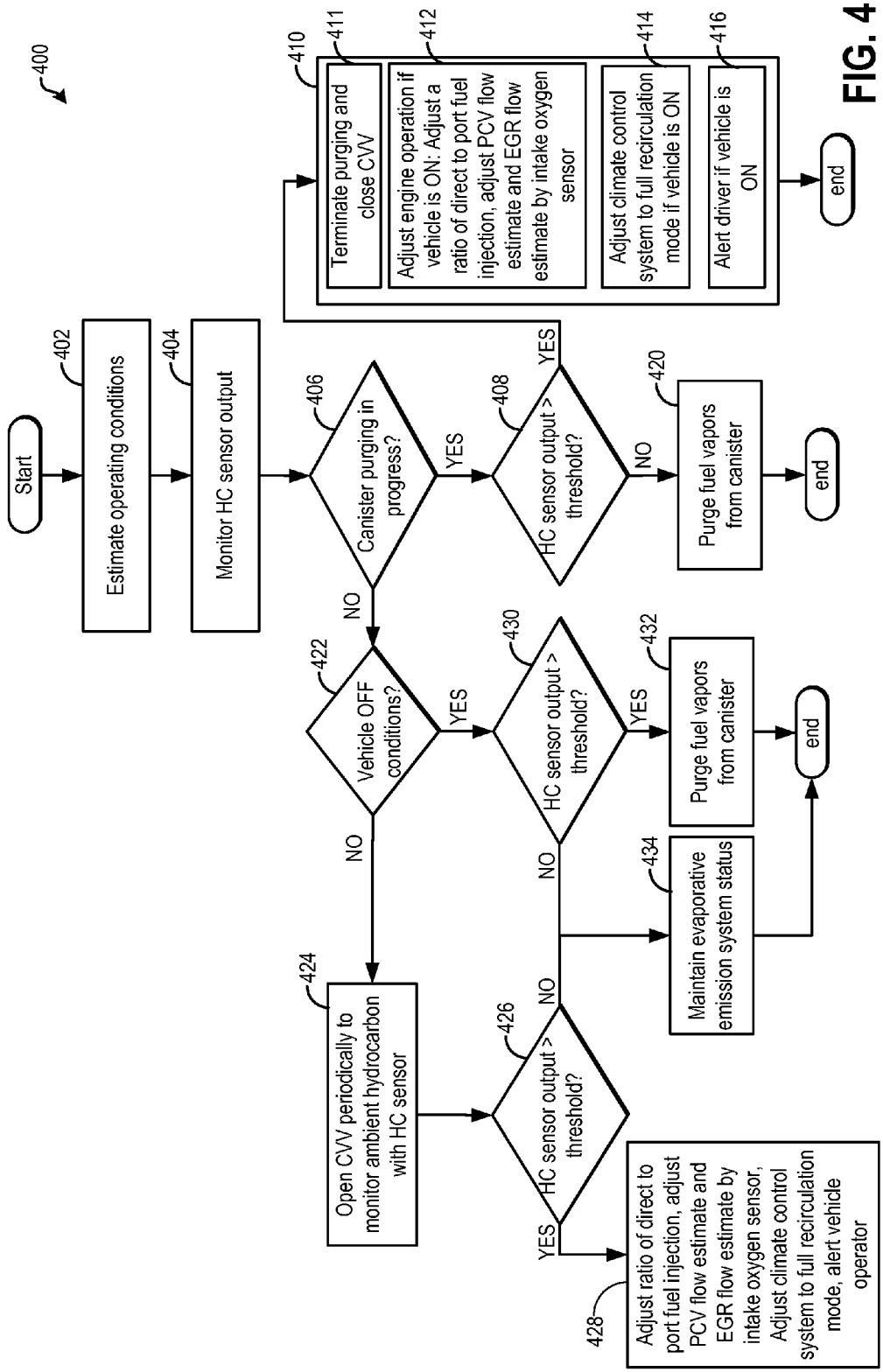
FIG. 4 shows a flowchart illustrating an example method for adjusting a vehicle operation based on a HC sensor output.

Now turning to FIG. 4, a method 400 is shown for adjusting an operation of a vehicle (such as vehicle 102 shown at FIG. 1) based on an amount of hydrocarbon indicated by a hydrocarbon sensor (such as hydrocarbon sensor 50 shown at FIGS. 1-2) located in a canister vent line (such as vent line 27 shown at FIGS. 1-2) in order to improve passenger comfort, and reduce evaporative and exhaust emissions. Adjusting vehicle operation may include adjusting one or more of an engine operation (such as operation of engine 10 shown at FIGS. 1-3), an evaporative emission system operation (such as operation of evaporative emission system 51 shown at FIGS. 1-2), and a climate control system operation (such as operation of climate control system 100 shown at FIG. 1). Instructions for carrying out method 400 and the rest of the methods included herein may be executed by a controller, such as controller 12 shown in FIGS. 1-3 based on instructions stored on a memory of the controller and in conjunction with signals received from sensors of the engine system, such as the sensors described above with reference to FIGS. 1-3. The controller may employ engine actuators of the engine system to adjust engine operation, according to the methods described below.

Method 400 may begin at 402 by estimating operating conditions. Operating conditions may include one or more vehicle conditions, one or more engine conditions, one or more evaporative emission control system conditions, and/or one or more fuel system conditions. For example, operating conditions may include, but are not limited to, a fuel vapor purge condition, a vehicle speed, an engine speed, an engine load, an ambient temperature, a barometric pressure, an exhaust temperature, an exhaust catalyst temperature, a hydrocarbon amount in a canister vent line, etc. Operating conditions may be measured by one or more sensors 16 coupled to controller 12, or may be estimated or inferred based on available data.

Upon estimating operating conditions, method 400 proceeds to 404. At 404, method 400 includes monitoring an output of the hydrocarbon sensor. The hydrocarbon sensor output may indicate an ambient hydrocarbon amount or a hydrocarbon breakthrough condition from the canister based on the operating condition. For example, during canister purging, the CVV is opened in order to draw ambient air into the canister via the CVV and the canister vent line for purging fuel vapors stored in the canister. Therefore, when fuel vapors are being purged from the canister, ambient air flows through the vent line and the hydrocarbon sensor output indicates the amount of hydrocarbons in the ambient air.

When the vehicle is not operating and the canister purging is not carried out, during certain conditions (such as when the vehicle is parked in a hot or sunny location over a diurnal cycle), hydrocarbons may desorb from the canister and migrate to the atmosphere via the canister vent line, thereby resulting in bleed emissions or hydrocarbon breakthrough. Therefore, during vehicle-off and purge off conditions, if the hydrocarbon sensor output indicates a hydrocarbon amount greater than a threshold, hydrocarbon breakthrough from the canister may be inferred.

Next, method 400 proceeds to 406. At 406, method 400 includes determining if a canister purging operation is in progress. A canister purging operation may be determined based on a CPV opening. For example, when the canister is being purged, the CPV is opened and the engine vacuum may be utilized to draw fuel vapors from the canister into the engine intake manifold via the CPV. Therefore, canister purging may be confirmed if the CPV is determined to be open.

Upon confirming that canister purging is in progress, method 400 proceeds to 408. At 408, method 400 includes determining if the hydrocarbon sensor output is greater than a threshold output. As discussed above, during purging, the hydrocarbon sensor output indicates an ambient hydrocarbon amount (that is, an amount of hydrocarbons present in the ambient air). Therefore, if the hydrocarbon sensor output is greater than the threshold output during purging, it may be inferred that the ambient hydrocarbon amount is greater than the threshold amount. Accordingly, if the answer at 408 is YES, method 400 proceeds to 410.

At 410, method 400 includes adjusting vehicle operations, which include, at 411 terminating the canister purging operation by closing the CPV. When a vehicle operates in a location where the ambient hydrocarbon amount is greater than the threshold amount (such as in a geographical location comprising manufacturing industries, power plants etc. that generate and release hydrocarbons in the atmosphere), during a purging operation, sufficient fresh air may not be available to displace the stored hydrocarbons in the canister. Therefore, instead of purging stored hydrocarbons, ambient air may be purged, which may lead to operating the engine at a more lean air to fuel ratio than desired. As a result, fuel economy may be reduced, and exhaust emissions may increase. Therefore, upon confirming that the ambient hydrocarbon amount is greater than the threshold amount during purging, the CPV may be closed to terminate canister purging.

Further, at 411, method 400 includes closing the CVV in response to the ambient hydrocarbon amount being greater than the threshold amount. For example, when a purging operation is terminated in response to the ambient hydrocarbon amount being greater than the threshold as discussed above, the hydrocarbons from the canister that are not purged may migrate via the canister vent line and the CVV to the atmosphere, thereby causing undesirable hydrocarbon breakthrough. Therefore, in order to prevent hydrocarbon breakthrough, the CVV may be closed.

Method 400 further includes, at 412, in response to the ambient hydrocarbon amount being greater than the threshold amount, adjusting an operation of the engine when the vehicle is on. Adjusting the engine operation may include adjusting a ratio of a first amount of fuel port injected into an engine cylinder to a remaining amount of fuel direct injected into the cylinder based on the ambient hydrocarbon amount in order to reduce particulate matter emissions. For example, in engine systems including a direct fuel injector and a port fuel injector for each cylinder, a first amount of fuel may be delivered via the port fuel injector and a remaining amount of fuel may be delivered via the direct fuel injector. In one example, in response to the ambient hydrocarbon amount being greater than the threshold amount, adjusting the ratio includes increasing the first amount of fuel port injected via the port injector while the decreasing the remaining amount of fuel direct injected via the direct injector. Further, as the ambient hydrocarbon amount increases, the ratio of the first amount to the remaining amount may be increased. In another example, in response to the ambient hydrocarbon amount being greater than the threshold amount, during a first combustion event, the first amount may be delivered via a single port fuel injection and the remaining amount may be delivered via a multiple direct fuel injections.

Adjusting the engine operation may further include adjusting an estimation of EGR flow indicated by an intake oxygen sensor based on the amount of hydrocarbons in the ambient air. An output of an intake oxygen sensor, such as sensor 34 shown at FIGS. 2 and 3, located in the intake manifold may indicate a measure of oxygen concentration of the intake gas stream. Based on the intake oxygen concentration, a percentage dilution of EGR, that is, a ratio of ambient air and recirculated air in the intake air stream may be determined. However, if the ambient hydrocarbon amount is greater than a threshold, an oxygen concentration in the ambient air may be less compared to when the ambient hydrocarbon amount is less than the threshold. Consequently, when the ambient hydrocarbon amount is greater than the threshold, the controller may determine a greater dilution of EGR in the intake air stream than actual based on the intake oxygen sensor output compared to when the ambient hydrocarbon amount is lower than the threshold. That is, a difference between the measured EGR flow based on the intake oxygen sensor and an actual EGR flow may be greater than a threshold difference. Therefore, an estimation of EGR flow based on the intake oxygen sensor may be adjusted so as to compensate for the excess hydrocarbons in the ambient air. For example, for a given operating condition, the vehicle controller may provide a lower estimate of EGR flow when the ambient hydrocarbon amount (indicated by the HC sensor output) is greater than the threshold than when the ambient hydrocarbon amount is less than the threshold.

Further, adjusting the engine operation may include adjusting a PCV flow estimation by the intake oxygen sensor based on the amount of hydrocarbon in the ambient air. For example, the PCV flow may be estimated to be greater than actual when increased amounts of hydrocarbons are present in the ambient air as the intake oxygen sensor measures less oxygen concentration in the intake air stream. Therefore, upon detecting increased amounts of hydrocarbon greater than the threshold in the ambient air, the PCV flow estimation is adjusted so as to compensate for excess hydrocarbon in the ambient air. For example, for a given operating condition, the vehicle controller may provide a lower estimate of PCV flow when the ambient hydrocarbon amount (indicated by the HC sensor output) is greater than the threshold than when the ambient hydrocarbon amount is less than the threshold.

Method 400 further includes, at 414, adjusting a climate control system of the vehicle in response to the ambient hydrocarbon amount being greater than the threshold amount. Adjusting the climate control system may include, closing all the windows of the vehicle, stopping delivery of ambient air to the vehicle cabin, and operating the climate control system in a full recirculation mode, wherein only cabin air is recirculated and no ambient air is brought into the cabin air to reduce exposure of vehicle passengers to high levels of hydrocarbons in the ambient air and hence, improve cabin comfort. In one example, if the vehicle is turned off, the climate control system may not be adjusted. For example, the vehicle may be parked in a polluted location, and the canister purging may be in progress (in response to detecting canister saturation and breakthrough, for example). During purging, the hydrocarbon sensor may indicate that the ambient hydrocarbon amount is greater than the threshold. Consequently, purging may be terminated and the CVV may be closed to prevent hydrocarbon breakthrough to the atmosphere. However, since the vehicle is not operating, the climate control system may not be operational and hence, may not be adjusted.

Method 400 further includes, at 416, altering a vehicle operator by indicating via an in-dash visual display message or a voice message that the ambient air quality is below a threshold. In some examples, the message may include a recommendation to close one or more windows of the vehicle. If the vehicle is not operating (e.g., in a parking mode), the message may not be indicated.

In this way, in response to the ambient hydrocarbon amount being greater than the threshold during canister purging, the purging operation may be terminated to reduce purging of ambient air, and the canister may be sealed from the atmosphere to reduce hydrocarbon breakthrough. Further, a ratio of a direct injection fuel amount to a port injection fuel amount may be adjusted to reduce particulate matter emissions. Further, an EGR flow estimation and a PCV flow estimation may be adjusted for improved air-fuel ratio control. Further still, a vehicle climate control system may be adjusted to recirculate only vehicle cabin air, thereby reducing passenger exposure to excess hydrocarbon levels in the ambient air.

Returning to 408, if it is determined that the HC sensor output is not greater than the threshold, method 400 proceeds to 420. At 420, method 400 includes continuing purging fuel vapors from the canister.

Returning to 406, if it is determined the canister purging operation is not in progress, method 400 proceeds to 422. At 422, method 400 includes determining if a vehicle-off condition is detected. Vehicle-off condition may vary based on the configuration of the vehicle system. For example, embodiments of vehicle-off conditions may vary for hybrid-drive enabled vehicle systems, non-hybrid-drive enabled vehicle systems, and push-button engine start-enabled vehicle systems. As a first example, in vehicles configured with an active key, a vehicle-off condition may include a key-off condition. As a second example, in vehicles configured with start/stop button, a vehicle-off condition may include a stop button actuated condition. As a third example, in vehicles configured with a passive key, a vehicle-off condition may include the passive key being outside a threshold distance of the vehicle.

Upon confirming vehicle-off condition, method 400 proceeds to 430. At 430, method 400 includes determining if the hydrocarbon sensor output is greater than the threshold amount. As discussed above, with respect to 404, during a vehicle-off and purging off condition, if the hydrocarbon sensor output is greater than the threshold output, it may be inferred that hydrocarbons are migrating to the atmosphere from the canister. Accordingly, if the answer at 430 is YES, hydrocarbon breakthrough into the atmosphere via the canister vent line may be confirmed and method 400 proceeds to 432.

At 432, method 400 includes purging fuel vapors from the canister in response to detecting hydrocarbon breakthrough. In one example, in response to detecting hydrocarbon breakthrough, purging during vehicle-off conditions may include directing hydrocarbons desorbed from the canister into a fuel tank by utilizing a vacuum pump while maintaining the CPV closed. In another example, the excess hydrocarbons may be pushed back into the canister by utilizing a pump (e.g., a reversible air pump) while maintaining the CPV closed. In yet another example, the excess hydrocarbons may be directed to an auxiliary canister for storage while maintaining the CPV closed. The vapors in the auxiliary canister may then be purged along with the main canister during vehicle on conditions. In still other examples, fuel vapors may be purged to a non-integrated refueling canister only system (NIRCOS) tank. The NIRCOS tank may be sealed during vehicle-off conditions by closing a FTIV. When sufficient vacuum is generated in the tank (e.g., tank vacuum greater than a threshold vacuum), the FTIV may be commanded open and a passive canister purge operation may be performed by utilizing the tank vacuum. In still further examples, the CVV may be commanded closed to seal the evaporative emissions system. When purging conditions are met (e.g., fuel tank vacuum (generated by diurnal cooling) greater than a threshold vacuum level), the CVV may be opened to perform a passive purge operation. The desorbed vapors may be directed back into the fuel tank, or may be stored in an auxiliary canister, and may subsequently be used for fueling the engine. In some examples, the engine may be forced to operate unfueled, and the CPV may be opened so as to utilize engine vacuum to purge fuel vapors from the canister into the intake via the CPV. The purged vapors may then be stored in an auxiliary canister.

In some examples, in response to detecting hydrocarbon break through, the CVV may be closed so as to reduce stored hydrocarbons migrating to the atmosphere. The desorbed hydrocarbons may be purged during a subsequent engine operation.

While the illustrated example shows detecting hydrocarbon breakthrough during vehicle-off conditions, in some examples hydrocarbon breakthrough can occur during vehicle operation due to reduced engine run times (e.g., HEV). If hydrocarbon breakthrough is detected, the engine may be forced to operate to purge the canister.

Returning to 430, if the answer at 430 is NO, then method 400 proceeds to 434. At 434, method 400 includes maintaining the status of the evaporative emissions system.

Returning to 422, if vehicle-off condition is not confirmed then method 400 proceeds to 424. At 424, method 400 includes periodically opening the CVV to monitor the amount of hydrocarbon in ambient air by utilizing the hydrocarbon sensor. For example, when canister is not purging and the vehicle is operating, by opening the CVV, ambient air may be drawn into the canister vent line, thereby enabling estimation of the ambient hydrocarbon amount by the hydrocarbon sensor disposed in the canister vent line. Next, method 400 proceeds to 426 to determine if the hydrocarbon sensor output is greater than the threshold. If YES, it may be inferred that the ambient hydrocarbon amount is greater than the threshold amount. Accordingly, method 400 proceeds to 428.

At 428, method 400 includes adjusting engine operation, adjusting climate control system operation, and alerting the vehicle operator that the ambient air quality is below a threshold as discussed above with respect to 410. Specifically, adjusting engine operation includes adjusting a ratio of an amount of fuel injected into the engine cylinder via a port fuel injector to a remaining amount of fuel injected into the engine cylinder via a direct fuel injector, adjusting an estimation of PCV flow by the intake oxygen sensor, and adjusting an estimation of an EGR flow by the intake oxygen sensor. Adjusting climate control system includes adjusting a heating, ventilation, and air conditioning (HVAC) system to stop drawing ambient air into the vehicle cabin and recirculating only cabin air to reduce exposure of vehicle passengers to high levels of hydrocarbons in the ambient air. Further, the climate control system may be adjusted to close all the windows of the vehicle to prevent ambient air from entering the vehicle cabin.

In this way, an evaporative emissions control system, a vehicle climate control system, and an engine system may be coordinately adjusted in response to detecting an ambient hydrocarbon amount greater than a threshold in order to improve fuel economy, reduce evaporative and exhaust emissions while providing improved passenger comfort.

In one example, the method of FIG. 4 provides for a method, comprising: comprising: in response to an ambient hydrocarbon amount estimated during purging fuel vapors from a canister to an engine being greater than a threshold, terminating the purging by closing a canister purge valve; and sealing the canister from the ambient air by closing a canister vent valve, wherein the ambient hydrocarbon amount is estimated based on an output from a hydrocarbon sensor coupled within a canister vent line fluidically coupling the canister with the ambient air.

The method further comprises: in response to the estimated ambient hydrocarbon amount being greater than the threshold during a vehicle on condition, adjusting an engine operation, wherein adjusting the engine operation comprises adjusting a ratio of a port fuel injection amount port injected into an engine cylinder to a direct fuel amount directly injected into the cylinder based on the ambient hydrocarbon amount, and wherein adjusting the ratio comprises increasing the ratio of the port fuel injection amount to the direct fuel amount as the ambient hydrocarbon amount increases. Further, adjusting the engine operation comprises adjusting one or more of a positive crank case ventilation flow estimation by an intake oxygen sensor, and an EGR flow estimation by the intake oxygen sensor based on the ambient hydrocarbon amount.

The method further comprises: in response to the estimated ambient hydrocarbon amount being greater than the threshold during a vehicle on condition, adjusting an operation of a vehicle climate control system, wherein adjusting the operation of the climate control system comprises selectively stopping providing ambient air into a vehicle cabin and providing air conditioning for the cabin by utilizing full cabin air recirculation.

The method further comprises: in response to the ambient hydrocarbon amount estimated during purging being greater than the threshold during the vehicle on condition, alerting a vehicle operator via an in-dash display or a voice message that a current ambient air quality is poor.

The method includes wherein the canister vent valve is disposed in the canister vent line; wherein the purge valve is disposed in a conduit coupling the canister to an intake of the engine; and wherein the fuel vapor canister contains activated charcoal.

The method further comprises: during a vehicle-off condition including a sealed fuel tank and not purging, in response to the output of the hydrocarbon sensor being greater than a threshold output, purging the canister.

Turning to FIG. 5, example adjustments of an engine operation, an evaporative emissions control system operation, and a climate control system operation in response to a hydrocarbon sensor output are shown. The sequence of FIG. 5 may be provided by executing instructions in a vehicle system, such as system of FIG. 1 according to the method of FIG. 4. Vertical markers at times t0-t5 represent times of interest during the sequence. Map 500 depicts vehicle operation status at plot 502, a hydrocarbon sensor output at plot 504, a threshold hydrocarbon sensor output at 506, a canister purge condition at plot 508, a CPV status at plot 510, a CVV status at plot 512, a FTIV valve status at plot 514, and a cabin air recirculation status at plot 516. The X axis represents time and time increases from the left side of the plot to the right side of the plot.

At t0, a vehicle may be operating at a location where an ambient hydrocarbon amount is less than a threshold amount (that is, in a less polluted location). Further, a canister purging operation may be in progress (plot 508) for the vehicle. Accordingly, the CPV is in an open position (plot 510), and the CVV is in an open position (plot 512). During the purging operation, due to the fresh air being drawn into the canister via the CVV and the canister vent line, an output of a HC sensor (such as sensor 50 shown at FIGS. 1-2) located in the canister vent line indicates an amount of hydrocarbon in the ambient air. Therefore, at t0, since the vehicle is operating in a less polluted location, the hydrocarbon sensor output (plot 604) may be below a threshold output (depicted by line 506). Still further, at t0, the FTIV may be closed (plot 514) and a climate-controlled air flow provided to the vehicle cabin by a climate control system may be adjusted (plot 516) to provide partial recirculation. For example, a user-requested setting may specify a partial recirculation mode, in which a ratio of fresh air to recirculated air is provided to the vehicle's cabin. Accordingly, a vehicle controller may operate the HVAC system to provide a portion of ambient air from outside the vehicle, and a remaining portion of recirculated air from inside the vehicle cabin, to the vehicle cabin. The ratio of fresh air to recirculated air may be adjusted by an actuator responsive to the user-requested HVAC settings.

At time just prior to t1, the vehicle may travel to a more polluted location where the ambient hydrocarbon levels are high. As a result, the HC sensor output (plot 504) increases above the threshold output (plot 506), thereby indicating that the ambient hydrocarbon amount is greater than the threshold amount. Therefore, at t1, in response to the HC sensor output being greater than the threshold, the canister purging operation may be terminated by closing the CPV (plot 510). The purging operation may be terminated to reduce purging of ambient air into the intake manifold that may occur when the ambient hydrocarbon levels are high. Further, in response to the HC sensor output being greater than the threshold, the evaporative emissions system may be sealed by closing the CVV (plot 512) to prevent hydrocarbon breakthrough to the atmosphere.

Still further, in response to the HC sensor output being greater than the threshold, the HVAC system may be adjusted so as to reduce exposure of vehicle occupants to ambient air comprising high hydrocarbon levels. For example, the vehicle controller may no longer maintain the user-requested settings, and may switch to operating the HVAC system in a full recirculation mode. Operating in the full recirculation mode may include stopping drawing ambient air into the HVAC system and recirculating only vehicle cabin air. In some examples, adjusting the HVAC system may further include, commanding all the vehicle windows to a fully closed position in order to reduce ambient air flow into the vehicle cabin via the vehicle windows. Further, in response to the HC sensor output greater than the threshold output, at t1, an alert message (such as a voice message or a visual message) may be provided to the vehicle operator. The alert message may include an indication to the vehicle operator that the ambient hydrocarbon amount is greater than the threshold amount. The alert message may further include a recommendation to close all the vehicle windows to reduce exposure to excess hydrocarbon in the ambient air. Further, at t1, the FTIV may remain closed. Still further, at t1, one or more engine operations may be adjusted. Details of adjusting engine operation when the HC sensor output is greater than the threshold output during vehicle operation will be further elaborated with respect to FIG. 6.

At times between t1 and t2, the CVV may be opened periodically to allow ambient air to flow through the canister vent line. Therefore, during times when the CVV is opened periodically, the HC sensor may be utilized to monitor the ambient hydrocarbon amount. Between t1 and t2, the HC sensor output may remain above the threshold indicating that the ambient hydrocarbon amount continues to remain above the threshold amount. In some examples, when the CVV is closed, the ambient hydrocarbon amount may be determined based on a second hydrocarbon sensor located at one or more locations such as at an engine air filter, near a cabin air filter, and in a portion of the canister vent line coupling the CVV with the ambient air. Further, between t1 and t2, the FTIV may remain closed and the HVAC system may continue to be operated in the full recirculation mode.

At time t2, the vehicle may travel to a less polluted location. Accordingly, the HC sensor output may decrease below the threshold output indicating that the ambient hydrocarbon amount has decreased below the threshold amount. In response to the HC sensor output decreasing below the threshold, the canister purging operation may be resumed by opening the CPV and the CVV. Further, the HVAC system may be adjusted based on a user-requested setting as discussed above. For example, the user-requested setting may specify a partial recirculation mode, and accordingly, a ratio of fresh air to recirculated air based on the user-requested setting is provided to the vehicle's cabin.

At times between t2 and t3, the HC sensor output may remain below the threshold, and the canister purging operation may continue until t3. At t3, the vehicle may cease operation. That is, the vehicle may be turned off. Consequently, the canister purging operation may be terminated by closing the CPV. The CVV valve, being a normally open valve, may be in an open position. Further, the FTIV may be opened to allow fuel vapors arising from diurnal changes to be stored in the fuel vapor canister. Further, in response to the vehicle-off condition, the climate control system may not be operated.

At times between t3 and t4, the vehicle may continue to remain in the vehicle-off condition. Further the HC sensor output may be below the threshold output. At time t4, the HC sensor output increases above the threshold. For example, during vehicle-off and purging off conditions, if the vehicle is parked in a hot or sunny location over a diurnal cycle, the stored hydrocarbons may displace from the canister and migrate towards the ambient air via the canister vent line and the CVV. The hydrocarbons migrating from the canister may be detected by the HC sensor located in the vent line. Therefore, at t4, in response to HC sensor output being above the threshold, hydrocarbon breakthrough is determined. In order to reduce hydrocarbon breakthrough, a hydrocarbon breakthrough strategy may be implemented. In one example, the hydrocarbon breakthrough strategy may include purging fuel vapor from the canister into an accumulator by pumping ambient air through the canister while maintaining the FTIV valve closed and the CPV closed. In another example, a reversible air pump may be utilized to draw ambient air into the canister to promote desorption of fuel vapor from the canister, and further direct the fuel vapors from the canister into a fuel tank. In yet another example, fuel vapors may be redistributed within the canister such that the fuel vapors are directed away from a canister vent port. In further examples, the engine may be forced to operate unfueled, and the CPV may be opened so as to utilize engine vacuum to purge fuel vapors from the canister into the intake via the CPV. The purged vapors may then be stored in an auxiliary canister. In still other examples, fuel vapors may be purged to a non-integrated refueling canister only system (NIRCOS) tank. The NIRCOS tank may be sealed during vehicle-off conditions by closing a FTIV. When sufficient vacuum is generated in the tank, the FTIV may be commanded open and a passive canister purge operation may be performed. In still further examples, the CVV may be commanded closed to seal the evaporative emissions system. When purging conditions are met (e.g., fuel tank vacuum (generated by diurnal cooling) greater than a threshold vacuum level), the CVV may be opened to perform a passive purge operation. The desorbed vapors may be directed back into the fuel tank, or may be stored in an auxiliary canister, and may subsequently be used for fueling the engine.

Immediately after time t4, as the canister is being purged, ambient air may be drawn into the canister via the canister vent line. Consequently, the HC sensor output (plot 504) indicates the amount of hydrocarbon in ambient air. Due to the vehicle being located in a less polluted location, the HC sensor output decreases immediately indicating that the ambient hydrocarbon amount is below the threshold. Between t4 and t5, the purging operation may continue based on a canister load (not shown). For example, the purging operation may continue until the canister load has decreased below a threshold load. At t5, the canister load may decrease below the threshold (not shown). Consequently, the vehicle-off purging operation may be terminated. For example, if an air pump is utilized for vehicle-off purging, terminating the purging may include stopping the air pump operation. Beyond t5, the vehicle may continue to remain in the vehicle-off condition. Further, the HC sensor output is below the threshold indicating that the amount of hydrocarbon in the canister vent line migrating from the canister to the atmosphere is below the threshold. Consequently, canister purging may not be performed. Further, the FTIV may be opened to allow diurnal vapors to be stored in the canister.

While a single threshold for hydrocarbon sensor output is shown, it will be appreciated that in some examples, a first threshold output may be utilized for detecting ambient hydrocarbon amount and a second threshold output may be utilized for detecting hydrocarbon breakthrough. For example, during purging, if the HC sensor output is greater than a first threshold output, it may be determined that an ambient hydrocarbon amount is greater than a first threshold amount. During purging off and vehicle-off conditions, if the HC sensor output is greater than a second threshold output, it may be determined that an amount of hydrocarbon in the vent line resulting from hydrocarbon breakthrough from the canister is greater than a second threshold amount.

Turning to FIG. 6, an example adjustment of an engine operation in response to a hydrocarbon sensor output during vehicle operation is shown. Specifically, an example adjustment of a ratio of a direct fuel injection amount to a port fuel injection amount in an engine comprising one or more cylinders, wherein each cylinder comprises a direct fuel injector and a port fuel injector is shown. The sequence of FIG. 6 may be provided by executing instructions in a vehicle system, such as system of FIG. 1 according to the method of FIG. 5. Vertical markers at times t0-t2 represent times of interest during the sequence. Map 600 depicts vehicle operation status at plot 602, a hydrocarbon sensor output at plot 604, a threshold hydrocarbon sensor output at 606, a canister purge condition at plot 608, a CVV status at plot 610, a port fuel injection amount at plot 612, a direct fuel injection amount at 614, and a status of cabin air recirculation provided by a climate control system at plot 616. The X axis represents time and time increases from the left side of the plot to the right side of the plot.

At time t0, and between t0 and just prior to t1, a vehicle may be operating, and a canister purging operation may be in progress (plot 608) for the vehicle. Accordingly, a CPV is in an open position (not shown), and the CVV is in an open position (plot 610). During the purging operation, as ambient air is drawn via the vent line, the HC sensor output indicates an ambient hydrocarbon amount. During these times, the vehicle may be operating in a less polluted location. Therefore, the hydrocarbon sensor output (plot 604) is below a threshold output (depicted by line 606). Further, at t0, and between t0 and just prior to t1, based on operating conditions such as an engine speed, an engine load, a vehicle speed, an ambient hydrocarbon amount, an amount of PM produced by the engine, an amount of fuel may be injected into an engine cylinder via a port fuel injector (plot 612) and a remaining amount of fuel may be injected into the cylinder via a direct fuel injector (plot 614). In the depicted example, a lower amount of fuel may be injected via the port fuel injector and a higher amount of fuel may be injected via the direct injector. That is, the amount of port injected fuel is less than the remaining amount of direct injected fuel. Still further, a FTIV may be closed, and a climate control system may be operating in a partial recirculation mode (plot 616). In one example, when operating in the partial recirculation mode, a ratio of ambient air to recirculated cabin air maybe provided to the vehicle cabin (plot 616) based on a user-requested setting. In another example, when operating in the partial recirculation mode, a ratio of ambient air to recirculated cabin air provided to the vehicle cabin may be based on a desired fuel economy while maintaining cabin comfort at a desired level.

At time just prior to t1, the vehicle may travel to a more polluted location. As a result, the HC sensor output (plot 604) increases above the threshold output (plot 606), indicating that the ambient hydrocarbon amount is greater than the threshold amount. Therefore, at t1, in response to the HC sensor output being greater than the threshold, the canister purging operation may be terminated (plot 608) and the evaporative emissions system may be sealed by closing the CVV (plot 610). Further, in response to the HC sensor output being greater than the threshold, the amount of fuel injected via the port fuel injector is increased (plot 612) and the remaining amount of fuel injected via the direct fuel injector is decreased (614). That is, the amount of port injected fuel is greater than the remaining amount of direct injected fuel. By increasing a port fuel injection amount relative to a direct fuel injection amount, exhaust PM emissions may be reduced without substantially affecting fuel economy.

In one example, adjusting engine operation in response to HC sensor output being greater than threshold during purging may further include one or more of adjusting an estimation of a PCV flow in the intake manifold and adjusting an estimation of an EGR flow in the intake manifold, wherein the estimation of the PCV flow, and the estimation of the EGR flow are based on an intake oxygen sensor output. For example, the estimations of the PCV flow and the EGR flow based the intake oxygen sensor output may take into account the presence of excess hydrocarbons present in the ambient air. As an example, for a given operating condition, a vehicle controller may provide a lower estimate of PCV flow when the HC sensor output is greater than the threshold than when the HC sensor output is less than the threshold. Likewise, for a given operating condition, the vehicle controller may provide a lower estimate of EGR flow when the HC sensor output is greater than the threshold than when the HC sensor output is less than the threshold.

Still further, in response to the HC sensor output being greater than the threshold, the climate control system may be adjusted to provide only cabin air recirculation so as to reduce an exposure of vehicle occupants to ambient air comprising high hydrocarbon levels. Further, all the vehicle windows may be commanded to a fully closed position in order to reduce ambient air flow into the vehicle cabin via the vehicle windows, and an alert message regarding reduced air quality may be provided to the vehicle operator.

At times between t1 and t2, the CVV may be opened periodically to allow ambient air to flow through the canister vent line so that when the CVV is opened, the HC sensor may be utilized to monitor the ambient hydrocarbon amount. In some examples, when the CVV is closed, the ambient hydrocarbon amount may be determined based on a second hydrocarbon sensor located at one or more locations such as at an engine air filter, near a cabin air filter, and in a portion of the canister vent line coupling the CVV with the ambient air. Between t1 and t2, the HC sensor output remains above the threshold indicating that the ambient hydrocarbon amount continues to remain above the threshold amount. Therefore, the decrease in the amount of fuel injected via the direct fuel injector (plot 614) and the increase in the remaining amount of fuel injected via the port fuel injector (plot 612) may be maintained. Further, as discussed above, the estimations of the PCV flow and the EGR flow may be adjusted based on the HC sensor output. Still further, the HVAC system may continue to be operated in the full recirculation mode (plot 616).

At time t2 and beyond, the vehicle may be operating in a less polluted location. Accordingly, the HC sensor output decreases below the threshold output and remains below the threshold indicating that the ambient hydrocarbon amount has decreased below the threshold amount. Consequently, the canister purging operation may be resumed by opening the CPV and the CVV. Further, the engine operation may be adjusted such that a higher amount of fuel is injected via the direct fuel injected and a lower amount of fuel is injected via the port fuel injector. Further, the estimations of the PCV flow and the EGR flow may be adjusted based on the HC sensor output. Still further, the HVAC system may be adjusted to a desired setting, wherein the desired setting may be based on a requirement indicated by a vehicle user. For example, the vehicle user may request a partial recirculation mode and accordingly, the HVAC system may provide a ratio of ambient air to recirculated cabin air to the vehicle cabin based on the user-requested setting.

In this way, an engine operation may be adjusted to improve fuel economy and reduce exhaust emissions in response to determining an ambient hydrocarbon amount greater than the threshold.

In one example, the sequence of FIGS. 5 and 6 may be provided by a method for a vehicle, comprising: in response to detecting a hydrocarbon amount greater than a threshold in a canister vent line, during a first condition including a vehicle on condition and purging fuel vapors from a fuel vapor canister into an engine: terminating the purging by closing a canister purge valve, and sealing the canister from the ambient air by closing a canister vent valve; and during a second condition including a vehicle-off condition and not purging fuel vapors: opening the canister vent valve to purge fuel vapors from the canister. The method includes wherein the hydrocarbon amount is detected based on an output from a hydrocarbon sensor coupled within the canister vent line fluidically coupling the canister with the ambient air; wherein the canister vent valve is disposed in the canister vent line; and wherein the purge valve is disposed in a conduit coupling the canister to an intake of the engine.

The method further comprises: during the first condition, adjusting an operation of a heating, ventilation, and air-conditioning system of the vehicle to selectively recirculate only internal cabin air within a vehicle cabin and stopping external ambient air flow into the cabin; adjusting an engine operation to adjust a ratio of a portion of fuel port injected into an engine cylinder to a remaining portion of fuel direct injected to the cylinder based on the detected hydrocarbon amount; and adjusting one or more of a positive crank case ventilation flow estimation by an intake oxygen sensor, and an EGR flow estimation by the intake oxygen sensor based on the ambient hydrocarbon amount.

In another representation, a method comprises: responsive to an ambient hydrocarbon level increasing above a threshold, during a first condition, adjusting an operation of a fuel vapor canister; during a second condition, adjusting a cabin environmental control; and during a third condition, adjusting an engine operation. The method further includes wherein, the ambient hydrocarbon level is determined during a canister purging operation, and wherein the ambient hydrocarbon level is determined based on an output of a hydrocarbon sensor couples within a canister vent line fluidically coupling a fuel vapor storage canister with the atmosphere. The method includes wherein the first condition comprises a vehicle on or off condition and/or an engine on or off condition, the second condition comprises a vehicle on condition while the engine is in an on or off condition, and the third condition comprises a vehicle on condition and an engine on condition. The method further includes wherein, adjusting an operation of a fuel vapor canister includes terminating a purging operation and sealing the canister from the atmosphere; adjusting the cabin environmental control includes providing only cabin air recirculation and not providing fresh air to a vehicle cabin, and further includes closing all vehicle windows; and adjusting the engine operation includes increasing a portion of a port fuel injection amount and decreasing a remaining portion of a direct fuel injection amount during a cylinder cycle, and further includes adjusting a PCV flow estimate by an intake oxygen sensor and an EGR flow estimate by the intake oxygen sensor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    responsive to an ambient hydrocarbon amount estimated during a canister fuel vapor purge being greater than a threshold:
        terminating the purging by closing a canister purge valve;
        sealing a canister from ambient air by closing a canister vent valve; and
        adjusting a ratio of a port fuel amount port injected into a cylinder to a direct fuel amount directly injected into the cylinder based on the ambient hydrocarbon amount.

2. The method of claim 1, wherein the ambient hydrocarbon amount is estimated based on an output from a hydrocarbon sensor coupled within a canister vent line fluidically coupling the canister with the ambient air.

3. The method of claim 2, further comprising: in response to the estimated ambient hydrocarbon amount being greater than the threshold during a vehicle on condition, adjusting an engine operation.

4. The method of claim 3, wherein adjusting the engine operation comprises adjusting one or more of a positive crank case ventilation flow estimation by an intake oxygen sensor, and an EGR flow estimation by the intake oxygen sensor based on the ambient hydrocarbon amount.

5. The method of claim 1, wherein adjusting the ratio comprises increasing the ratio of the port fuel amount to the direct fuel amount as the ambient hydrocarbon amount increases.

6. The method of claim 2, further comprising: in response to the estimated ambient hydrocarbon amount being greater than the threshold during a vehicle on condition, adjusting an operation of a vehicle climate control system.

7. The method of claim 6, wherein adjusting the operation of the climate control system comprises selectively stopping providing ambient air into a vehicle cabin and providing air conditioning for the cabin by utilizing full cabin air recirculation.

8. The method of claim 3, further comprising: in response to the ambient hydrocarbon amount estimated during purging being greater than the threshold during the vehicle on condition, alerting a vehicle operator via an in-dash display or a voice message that a current ambient air quality is poor.

9. The method of claim 2, wherein the canister vent valve is disposed in the canister vent line; wherein the purge valve is disposed in a conduit coupling the canister to an intake of an engine; and wherein the fuel vapor canister contains activated charcoal.

10. The method of claim 2, further comprising:
    during a vehicle-off condition including a sealed fuel tank and not purging, in response to the output of the hydrocarbon sensor being greater than a threshold output, purging the canister.

11. A method for a vehicle, comprising:
    in response to detecting a hydrocarbon amount greater than a threshold in a canister vent line,
        during a first condition including a vehicle on condition and purging fuel vapors from a fuel vapor canister into an engine: terminating the purging by closing a canister purge valve, and sealing the canister from ambient air by closing a canister vent valve; and
        during a second condition including a vehicle-off condition and not purging fuel vapors: if a sealed fuel tank vacuum is greater than a threshold, opening the canister vent valve and opening a fuel tank isolation valve coupling the canister and a fuel tank to purge fuel vapors from the canister, otherwise, closing the canister vent valve.

12. The method of claim 11, wherein the hydrocarbon amount is detected based on an output from a hydrocarbon sensor coupled within the canister vent line fluidically coupling the canister with the ambient air; wherein the canister vent valve is disposed in the canister vent line; and wherein the purge valve is disposed in a conduit coupling the canister to an intake of the engine.

13. The method of claim 11, further comprising: during the first condition, adjusting an operation of a heating, ventilation, and air-conditioning system of the vehicle to selectively recirculate only internal cabin air within a vehicle cabin and stopping external ambient air flow into the cabin.

14. The method of claim 13, further comprising: during the first condition, adjusting an engine operation to adjust a ratio of a portion of fuel port injected into an engine cylinder to a remaining portion of fuel direct injected to the cylinder based on the detected hydrocarbon amount.

15. The method of claim 13, further comprising: during the first condition, adjusting one or more of a positive crank case ventilation flow estimation by an intake oxygen sensor, and an EGR flow estimation by the intake oxygen sensor based on the hydrocarbon amount.

16. A vehicle system, comprising:
    an engine;
    a heating, ventilation, and air-conditioning system;
    a fuel vapor canister;
    a hydrocarbon sensor coupled within a canister vent line coupling the canister to ambient air; and
    a controller configured with instructions stored in non-transitory memory, that when executed, cause the controller to:

during a first condition, determine that an ambient hydrocarbon amount is greater than a threshold amount; and during a second condition, determine hydrocarbon breakthrough from the canister.

17. The system of claim 16, wherein the first condition includes an output of the hydrocarbon sensor greater than a threshold, a vehicle on condition, and purging fuel vapors.

18. The system of claim 17, wherein the second condition includes the output of the hydrocarbon sensor greater than the threshold, a vehicle-off condition, and not purging fuel vapors.

19. The system of claim 18, wherein the controller is further configured with instructions stored in non-transitory memory, that when executed, cause the controller to:

during the first condition, in response to the determination: close a canister purge valve disposed in a conduit coupling the canister to an intake of the engine, close a canister vent valve disposed in the canister vent line, adjust an engine operation to increase a ratio of a portion of fuel port injected into an engine cylinder to a remaining portion of fuel direct injected into the cylinder; and adjust an operation of the heating, ventilation, and air-conditioning system to stop recirculation of ambient air within a vehicle cabin and recirculate only cabin air within the cabin; and during the second condition, in response to the hydrocarbon breakthrough: if a sealed fuel tank vacuum is greater than a threshold, open the canister vent valve and open a fuel tank isolation valve coupling the canister with a fuel tank to passively purge the fuel vapor canister, otherwise, close the canister vent valve and the fuel tank isolation valve.

* * * * *